US005496511A

United States Patent [19]

Juillet

[11] Patent Number: 5,496,511

[45] Date of Patent: Mar. 5, 1996

[54] METHOD FOR STATICALLY FORMING ROLLED LAMPSHADE EDGES

[75] Inventor: Hubert Juillet, Mulhouse, France

[73] Assignee: Corep, Begles Cedex, France

[21] Appl. No.: 119,140

[22] PCT Filed: Jan. 21, 1993

[86] PCT No.: PCT/FR93/00057

§ 371 Date: Sep. 21, 1993

§ 102(e) Date: Sep. 21, 1993

[87] PCT Pub. No.: W093-15356

PCT Pub. Date: Aug. 5, 1993

[30] Foreign Application Priority Data

Jan. 22, 1992 [FR] France .................................. 92 00733

[51] Int. Cl.$^6$ .................................................... B29C 51/28

[52] U.S. Cl. .......................... 264/314; 264/316; 425/389

[58] Field of Search .................................... 264/510, 516, 264/316, 314, 248, 249, 252, 292; 425/389, 403, 405.1, 384; 156/285, 583.4

[56] References Cited

U.S. PATENT DOCUMENTS

| | | | |
|---|---|---|---|
| 892,702 | 7/1908 | Wymah | 425/389 |
| 2,265,111 | 12/1941 | Brown | 264/292 |
| 3,294,607 | 12/1966 | Rothermel et al. | 264/506 |
| 3,334,383 | 8/1967 | Irvine | 425/389 |
| 3,453,162 | 7/1969 | Turner | 264/516 |
| 3,497,917 | 3/1970 | Negoro | 425/384 |
| 3,793,427 | 2/1974 | Heisler | 264/249 |
| 3,827,130 | 8/1974 | Bauman | 264/516 |
| 3,833,326 | 9/1974 | Peterson et al. | 264/249 |
| 4,181,698 | 1/1980 | Hayes et al. | 264/249 |
| 4,325,905 | 4/1982 | Takahashi | 264/516 |
| 4,386,045 | 5/1983 | Väisänen | 264/249 |
| 4,660,498 | 4/1987 | Madison | 264/516 |
| 4,705,589 | 11/1987 | Enders | 425/389 |

FOREIGN PATENT DOCUMENTS

| | | |
|---|---|---|
| 1245721 | 10/1960 | France . |
| 3611514 | 10/1987 | Germany . |
| 3727926 | 3/1988 | Germany . |
| 60-097826 | 5/1985 | Japan . |
| 694379 | 7/1953 | United Kingdom . |

*Primary Examiner*—Catherine Timm
*Attorney, Agent, or Firm*—Young & Thompson

[57] ABSTRACT

Lampshades are formed by fitting a lampshade blank on a mandrel of complementary shape, which mandrel also supports upper and lower metal hoops to be incorporated into the lampshade. The edges of the lampshade blank are then locally heated and deformed to surround the metal hoops. The deformation of the heated edges of the lampshade blank may advantageously be effected by surrounding the lampshade/mandrel assembly with a membrane, and forcing the membrane into contact with the assembly.

4 Claims, 5 Drawing Sheets

METHOD FOR STATICALLY FORMING ROLLED LAMPSHADE EDGES

This invention relates to a new industrial product consisting of a system for providing rolled edges on lampshades, these edges being rolled around the upper and lower hoops of the said lampshades. The hoops in question are made mainly of iron wire, while the blanks consist of a thermoplastic material which may or may not be coated and may or may not be bonded, especially to fabrics.

Systems based on the principle of heating the edges of the lampshades followed by mechanical spinning analogous to metal spinning, especially of tins, are already known, the essential components of which are rollers and chases, the whole assembly operating in a circular movement. These systems have the disadvantage that it is difficult or impossible to use them on an industrial scale, while the edges in question undergo lamination detrimental to their aesthetic appearance and flatness.

This invention aims to obviate these disadvantages and relates to a system for forming the edges of the lampshades by a static process.

Once the blank of the lampshade has been assembled, essentially forming a truncated cone, it is placed on a form provided in advance with the upper and lower hoops of the lampshade.

The upper and lower ends of the blank are then heated to their softening point, then an elastic membrane is sucked on to the said blank, shaping the latter on its support.

The lampshade is finished.

The invention will be more readily understood with reference to the following text and the accompanying drawings, in which.

Figure 1:
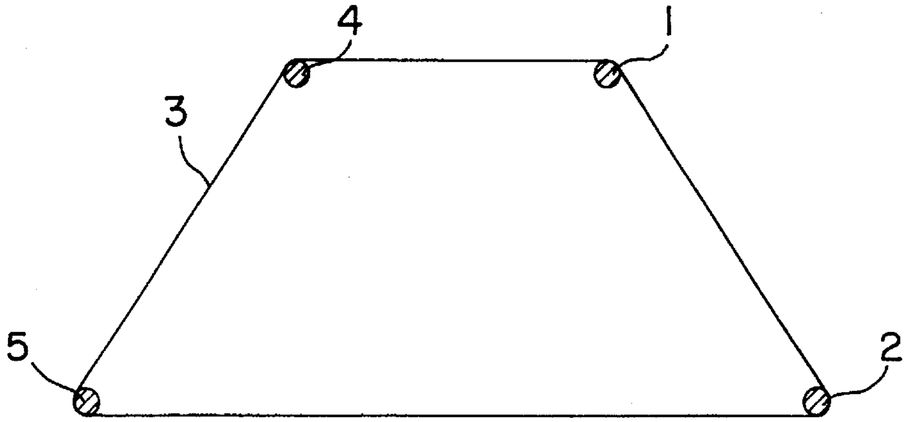
FIG. 1 is a section of the lampshade.
Figure 2:
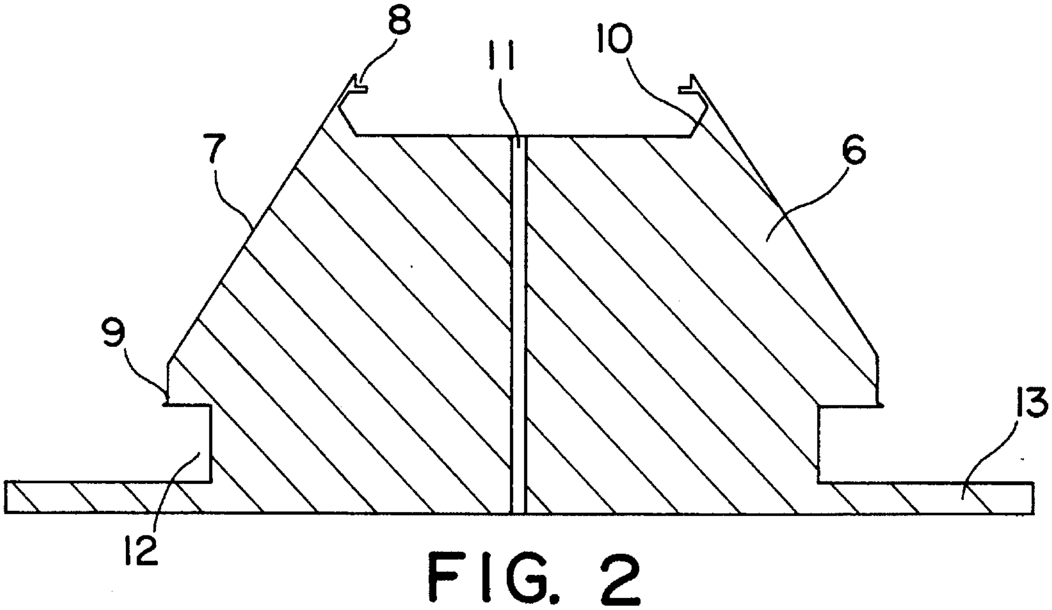
FIG. 2 is a section of the form.
Figure 3:
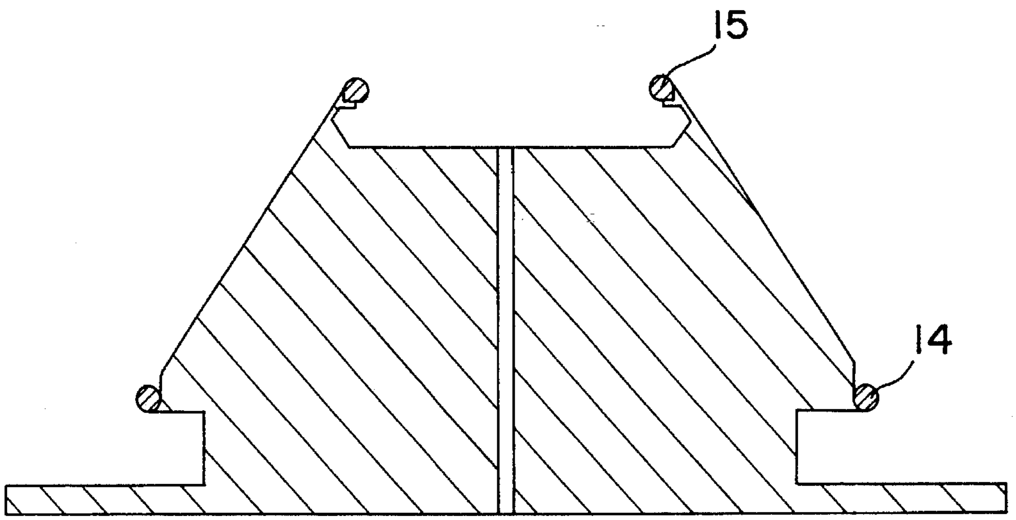
FIG. 3 is a section of the form with the upper and lower hoops.
Figure 4:
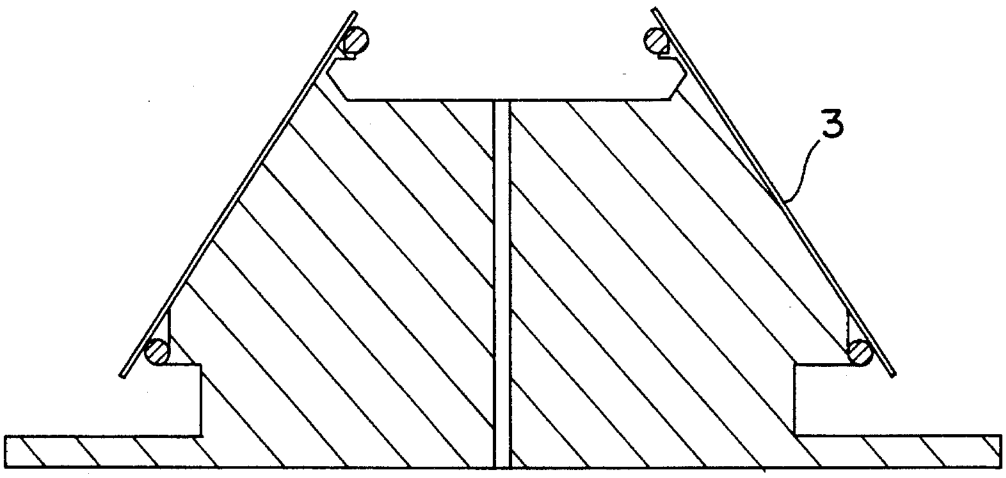
FIG. 4 is a section of the form with the upper and lower hoops and the blank.
Figure 5:
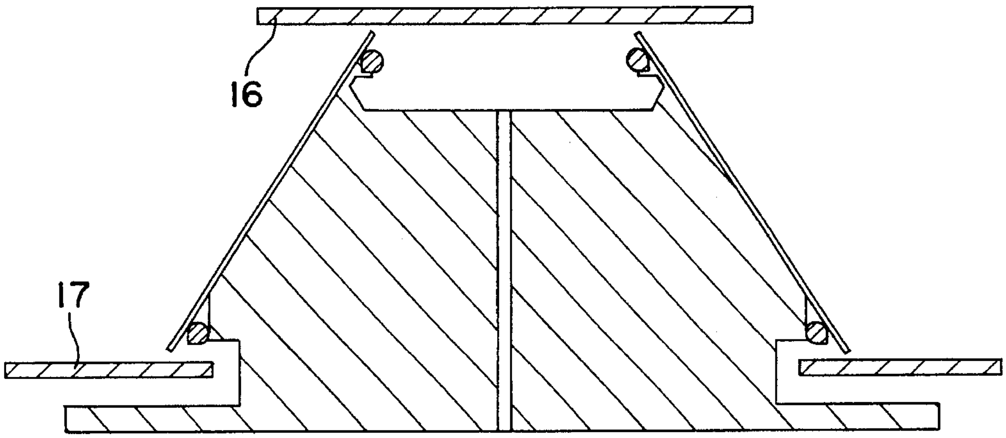
FIG. 5 is a section of the system during heating.
Figure 6:
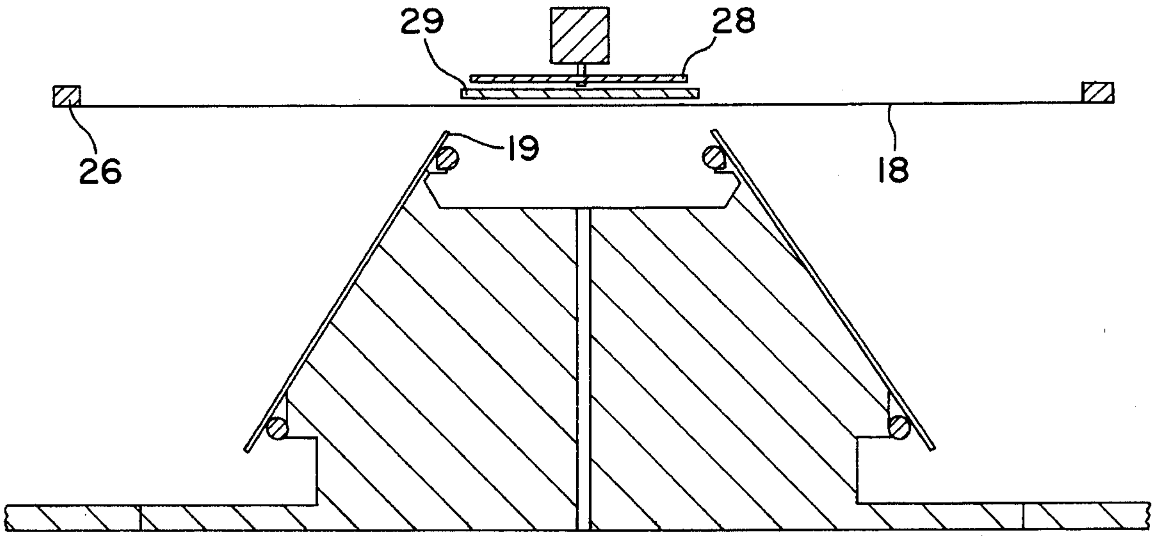
FIG. 6 is a section of the system after heating and during application of the membrane.
Figure 7:
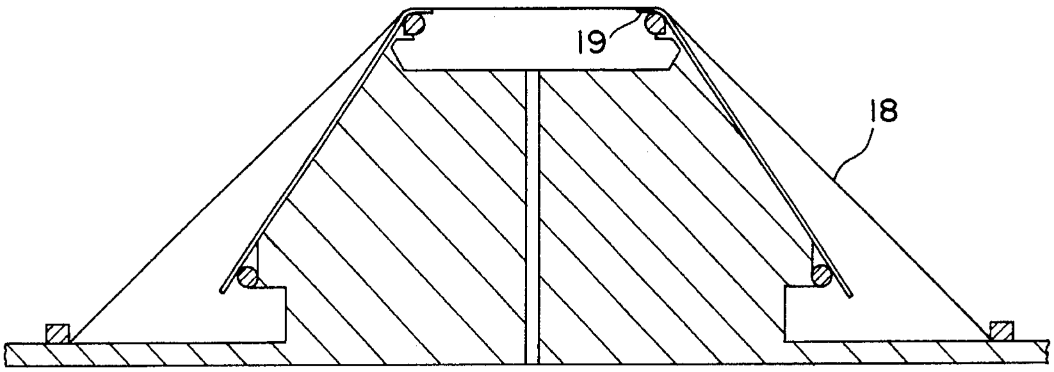
FIG. 7 is a section of the system after lowering of the membrane.
Figure 8:
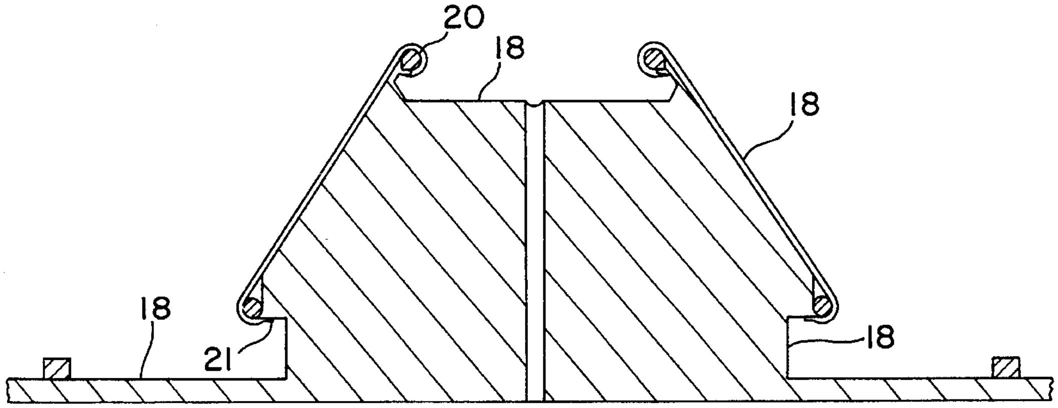
FIG. 8 is a section of the system during sucking of the membrane.
Figure 9:
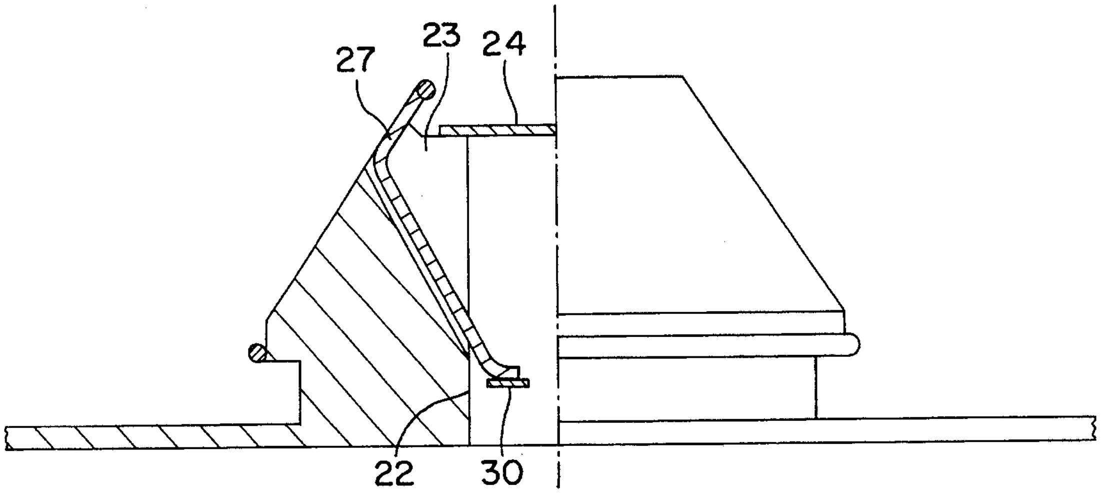
FIG. 9 is a section of a variant of the system, the upper hoop being provided with a support.
Figure 10:
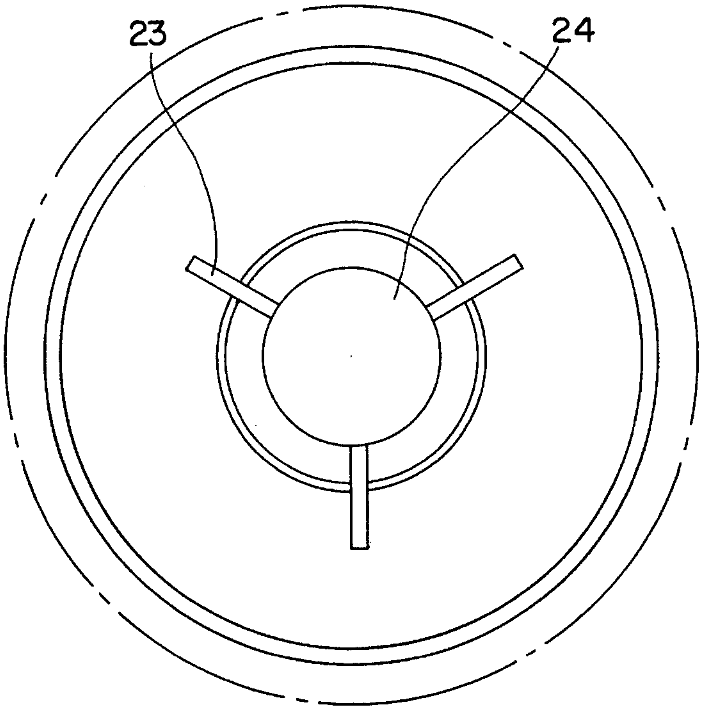
FIG. 10 is a top view of FIG. 9 without the upper hoop and without the support in place.

A lampshade produced according to this system consists of upper (1) and lower (2) metal hoops and a blank of thermoplastic material (3).

The hoops are held on the blank by virtue of a crimp formed by appropriate deformation of the edges of the said blank (4) and (5).

The said crimp is produced on a form or mandrel (6) which comprises all of the elements required to this end, i.e.: a shape perfectly matching that of the lampshade, an adequate slope (7), a recess (8) adapted to receive the upper hoop and a recess (9) for the lower hoop, a shoulder (10) and a recess (11). Finally the form is placed on a table (13).

The following are placed on the form in sequence as the edges are rolled according to this system: the lower hoop (14), the upper hoop (15) and the assembled blank (3).

Once these three elements have been mounted, two heating plates are introduced, an upper plate (16) adapted to heat the upper edge and a lower plate (17) adapted to heat the lower edge.

These plates remain in position for the time required to heat the said edges.

Once the said edges have been softened by the action of the temperature the said plates are removed.

An elastic membrane (18) placed in a frame like a drum is then placed over the top of the form. This membrane is then applied to the form by a vertical movement until the frame (26) touches the table (13).

The upper edge (19) of the blank then begins to deform under the action of the said membrane.

At that moment, a vacuum is created in the said form, so that the membrane is fitted on to the form, taking with it the upper and lower edges of the blank so as to bend them (20), (21) around the hoops. Once crimping has been effected the suction is stopped and the membrane resumes its original flat shape.

The membrane is then removed and the finished lampshade can be removed from its housing, i.e. the form.

As a variant, the upper hoop is provided with a support consisting of three rods (27) welded on to a washer (30). It is still possible to form a lampshade equipped in this manner with a support by virtue of a central recess (22) and three sectorial recesses (23).

Moreover, in this variant, a small plate (24) is disposed in the form once the upper ring has been mounted, in order to prevent the membrane from being sucked into, the recess (22).

Once finished, lampshades provided with a support can be removed from the form by virtue of an ejector which pushes on the washer (30).

The system according to this invention has several advantages over the system known at present, i.e.:

- the method can be used on an industrial scale in a simple manner and allows for very high rates with a minimum of operators;
- the qualifications of the operators of a machine operating according to this process can be minimal;
- the products produced in this manner have a perfect finish, especially flatness and the complete absence of guide marks;
- this finish does not depend on the qualifications of the operators;
- a change of model does not require any adjustment of the machine, only the said form being replaced.

This replacement is effected within a minimum time period as the form is simply placed on the table of the machine, according to the process, in a recess provided to this end, and

- finally, the size of the lampshades produced is no longer a criterion for the satisfactory execution thereof, the largest lampshades having the same impeccable finish as the smallest ones.

This invention is of course not limited to the description given hereinabove and numerous amendments can be made thereto without thereby going beyond the its field of application.

Thus:

- forms with different shapes from the ones shown can be used;
- supports consisting of a number of rods greater than or smaller than the number of rods shown can be used;
- several membranes which may or may not be superimposed, each of a different or identical nature, can be used;
- membranes which are flexible, but not elastic can be used;

- membranes having a constant or varying thickness can be used;
- the membrane or membranes can be cooled or heated, some being heated, some being cooled;
- compressed air can be used to fit the membrane on to the form, the exterior of the membrane in this case being placed under cover;
- this compressed air can be replaced by a fluid, and
- the edges of the blanks can be formed directly on the form without including the said hoops or including only one of them.

Moreover, a ventilator disposed on the form is shown at (28).

The function of the ventilator is to regulate the temperature of the membrane (18) when it is placed on the form and to regulate the form itself when the membrane or the heating plate is removed.

The air blown by this ventilator is cooled or heated if desired by a heat exchanger (29).

I claim:

1. Method of producing a lampshade, comprising fitting a lampshade blank of thermoplastic material and at least one metal hoop on a mandrel, locally heating only edge regions of said lampshade blank, to a softening point of said thermoplastic material, surrounding said lampshade blank and said mandrel with a deformable membrane, and forcing said deformable membrane into contact with said lampshade blank and said mandrel, thereby to deform said heated edge regions to surround said at least one metal hoop.

2. The method according to claim 1, wherein upper and lower metal hoops are fitted on said mandrel, and upper and lower edge regions of said lampshade blank are heated to the softening point of said thermoplastic material, and wherein forcing of said membrane into contact with said lampshade blank and said mandrel causes said upper and lower edge regions simultaneously to deform so as to surround said upper and lower metal hoops.

3. Method according to claim 1, wherein said membrane is forced into contact with said lampshade blank and said mandrel by generating a suction between (a) said membrane and (b) said lampshade and said mandrel.

4. The method according to claim 3, wherein said mandrel comprises a central traversing passageway through which said suction is generated.

* * * * *